(12) United States Patent
Banks et al.

(10) Patent No.: US 7,407,042 B2
(45) Date of Patent: Aug. 5, 2008

(54) BRAKE ACTUATOR MECHANISM WITH OVERLOAD PROTECTION

(75) Inventors: Daniel E. Banks, Climax, MI (US); Michael R. Brown, II, Battle Creek, MI (US); Alan Hendershot, Schoolcraft, MI (US)

(73) Assignee: Bendix Spicer Foundation Brake, LLC, Elyria, OH (US)

( * ) Notice: Subject to any disclaimer, the term of this patent is extended or adjusted under 35 U.S.C. 154(b) by 259 days.

(21) Appl. No.: 11/056,958

(22) Filed: Feb. 11, 2005

(65) Prior Publication Data

US 2006/0180411 A1 Aug. 17, 2006

(51) Int. Cl.
F16D 55/08 (2006.01)

(52) U.S. Cl. .................................. 188/72.9; 188/72.7

(58) Field of Classification Search ................ 188/72.9, 188/72.7, 72.6, 196 D, 196 V, 196 P, 196 M, 188/196 BA, 71.7, 71.8; 403/372
See application file for complete search history.

(56) References Cited

U.S. PATENT DOCUMENTS

| | | | |
|---|---|---|---|
| 3,061,386 A | 10/1962 | Dix et al. | |
| 4,278,152 A * | 7/1981 | Tosi | 188/71.9 |
| 4,394,890 A | 7/1983 | Kleinhagen, Jr. | |
| 4,399,894 A * | 8/1983 | Tribe | 188/71.9 |
| 4,478,316 A | 10/1984 | Davidson | |
| 4,478,317 A | 10/1984 | Sheill | |
| 4,981,390 A * | 1/1991 | Cramer et al. | 403/371 |
| 5,000,294 A * | 3/1991 | Hunnicutt et al. | 188/71.9 |
| 5,449,052 A * | 9/1995 | Macke et al. | 188/71.9 |
| 5,520,267 A | 5/1996 | Giering et al. | |
| 5,731,640 A | 3/1998 | Dietrich et al. | |
| 5,819,871 A * | 10/1998 | Takaoka | 180/444 |
| 6,250,434 B1 * | 6/2001 | Baumgartner et al. | 188/71.7 |
| 2002/0112555 A1 | 8/2002 | Chikaraishi et al. | |

FOREIGN PATENT DOCUMENTS

GB 1492391 11/1977

\* cited by examiner

*Primary Examiner*—Robert A. Siconolfi
*Assistant Examiner*—Mariano Sy
(74) *Attorney, Agent, or Firm*—Marshall & Melhorn, LLC

(57) ABSTRACT

A brake actuator mechanism has an inner shaft received at least partially within an outer shaft. The overload protection device is disposed between the inner shaft and the outer shaft. The device selectively couples the inner shaft and the outer shaft so that when the outer shaft receives a torque beyond a predetermined limit, the device allows the outer shaft to rotate about the inner shaft without rotating the inner shaft.

18 Claims, 5 Drawing Sheets

BRAKE ACTUATOR MECHANISM WITH OVERLOAD PROTECTION

FIELD OF THE INVENTION

The present invention relates to a brake actuator mechanism with overload protection. More specifically, the invention relates to an air disc brake actuator mechanism with an overload protection clutch mechanism.

BACKGROUND OF THE INVENTION

Brake actuator mechanisms of the prior art have adjustment devices that allow the brake clearance to be precisely adjusted manually from a point exterior to the brake while the brake is installed on the vehicle. The adjustment devices have structures, called back-off tools, that are designed to break at a lower torque rating than any other internal component of the brake actuator mechanism. Such devices are important because they break before other internal components are damaged during an improper adjustment procedure. The internal components of the brake actuator mechanism are expensive and/or difficult to replace, thus they require such protection.

Various prior art devices are known to prevent improper adjustment of brake mechanisms and/or facilitate proper adjustment of brake mechanisms. For example, in both U.S. Pat. Nos. 4,478,316 and 4,478,317 a slack adjuster is taught having clutch means between the adjusting sleeve and the housing. The clutch means includes a helical spring that extends around the sleeve. The clutch means is used to prevent clockwise rotation.

U.S. Pat. No. 4,394,890 provides for an automatic slack adjuster having a force limiting clutch that is wound such that when transferring clockwise torque from the intermediate sleeve to the driven sleeve, its torque transmitting capability is greater than that required to rotate a nut member when the friction linings are not in contact with the disc, but less than the torque required to rotate the nut member if the friction linings are in contact with the disc. A driving sleeve is connected to the intermediate sleeve by another clutch. The clutch is designed to transmit all of the torque developed by the driving sleeve in one direction of rotation to the intermediate sleeve, but will transmit very little of the torque developed by the driving sleeve to the intermediate sleeve in the other direction of rotation.

U.S. Pat. No. 4,399,894 teaches a push rod slack adjuster having a disc clutch drive. The disc clutch drive is comprised of a pair of clutch plates which have a tanged connection to an actuating shaft. A compression spring bears against one of the clutch plates. The spring presets the pressure existing between the various clutch plates and determines the torque at which this clutch will slip.

The prior art devices briefly discussed above, and those known to those skilled in the art, have several disadvantages. First, if the back-off tool in the adjustment device breaks under an excessive torque, although it protected the internal components of the mechanism, the back-off tool still must be replaced prior to completing maintenance on the brake. Replacing a broken back-off tool increases the brake maintenance cost.

Second, an individual performing brake maintenance may not know the back-off tool is broken, if they do know, they may forget to replace it during maintenance. A broken back-off tool can cause damage to the brake mechanism.

In light of at least the above-disadvantages, it would be advantageous to have a device that is permanently installed in the brake actuator mechanism that continuously provides overload protection to the brake actuator mechanism.

SUMMARY OF THE INVENTION

The present invention is directed toward a brake actuator mechanism with overload protection. The brake actuator mechanism comprises an inner shaft having a first portion connected to a brake actuator clutch mechanism and a second portion. The outer shaft overlaps at least a portion of the second portion of the inner shaft. A ring is disposed between the inner shaft and the outer shaft. The ring has at least one raised surface for selectively coupling the inner shaft and the outer shaft.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
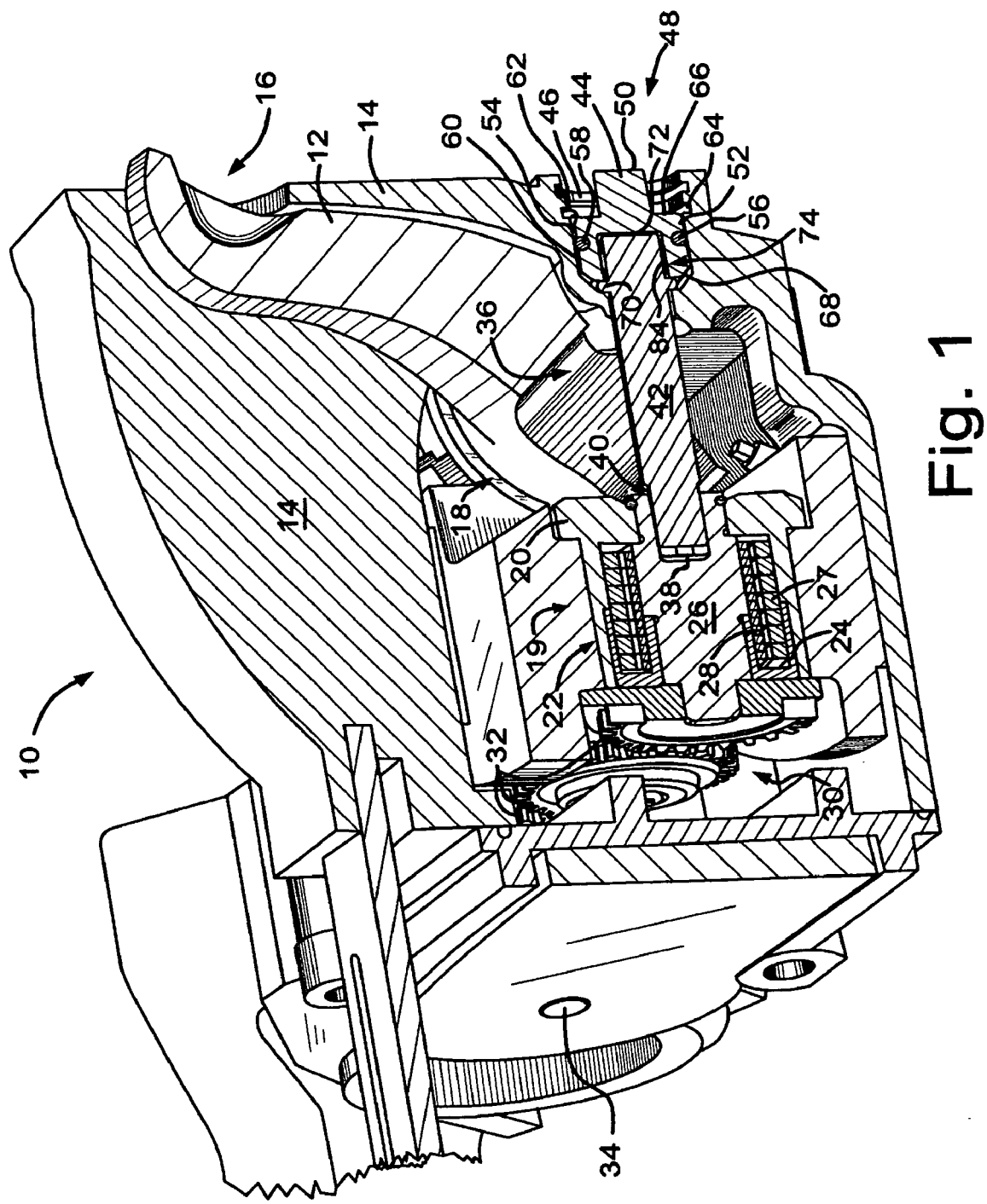
FIG. 1 is a cut-away, partial perspective view depicting a preferred embodiment of a brake actuator mechanism of the present invention.
Figure 2:
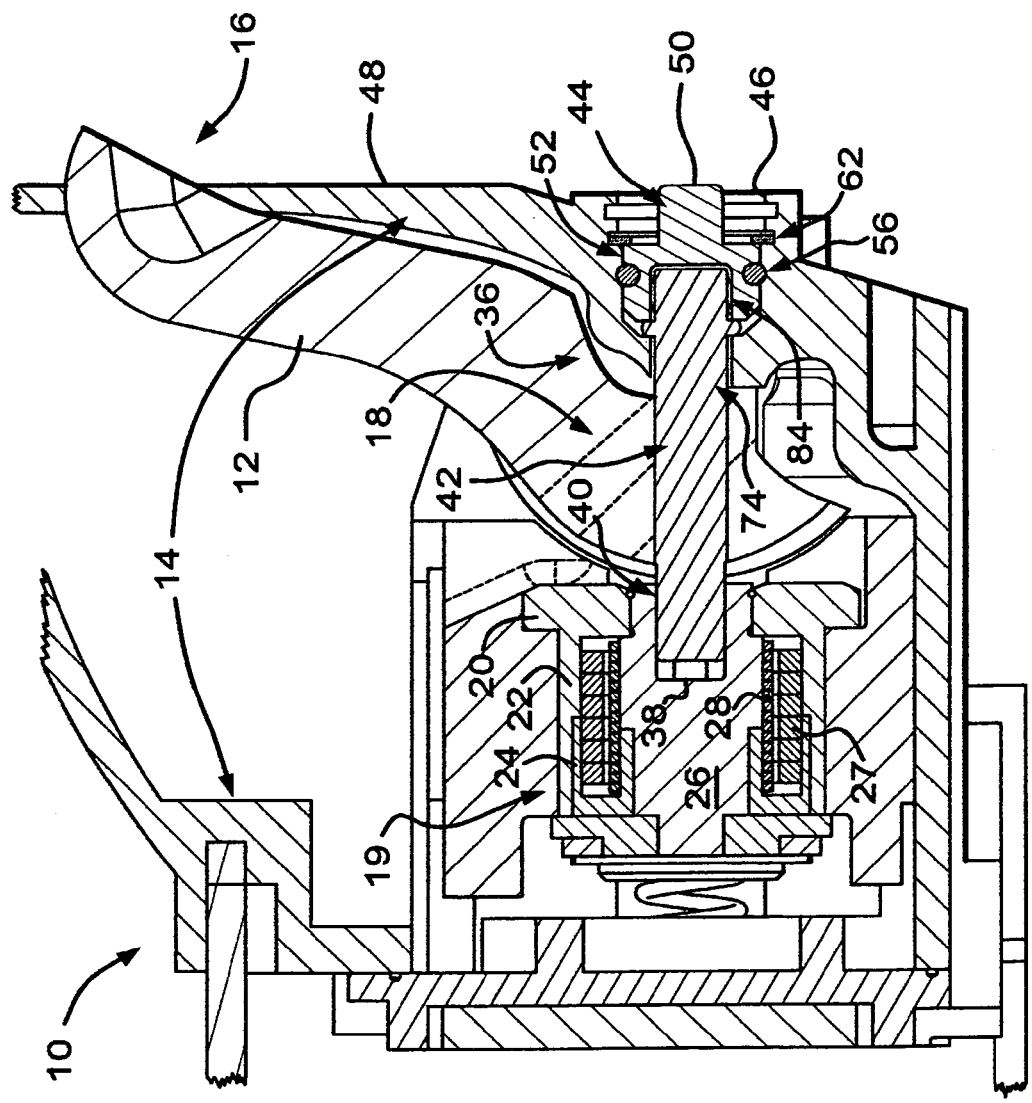
FIG. 2 is a cut-away, partial side view of the brake actuator mechanism of FIG. 1.

Referring now to FIGS. 1 and 2, a preferred embodiment of a brake actuator mechanism 10 of the present invention is depicted. A lever 12, housed within a caliper housing 14 is shown. The lever 12 is connected at a first end 16 to a brake actuating device (not shown) of a vehicle (not shown), as known to those skilled in the art. The brake actuating device is controlled by the operator in the vehicle. A second end 18 of the lever 12 is connected to a clutch mechanism 19. The clutch mechanism 19 comprises a rotatable outer clutch sleeve 20. The outer clutch sleeve 20 is connected to the lever 12 with one or more pins (not shown).

The outer clutch sleeve 20 has a tubular portion 22 that is connected to a clutch cap 24 via a spring clutch 27. The clutch cap 24 is coupled to a clutch drive shaft 26 via a spring 28, all of which are part of the clutch mechanism 19.

The clutch drive shaft 26 is drivingly connected to a gear train 30, as shown in FIG. 1. The gear train 30 is comprised of a plurality of gears 32. The gears 32 are connected to a tappet sleeve (not shown). Those skilled in the art will appreciate that other mechanisms may be used to connect the clutch drive shaft 26 with the tappet sleeve.

The tappet sleeve is connected to a tappet 34 by any means known to those skilled in the art for axially moving the tappet 34. The means include, but are not limited to, one or more cams, and/or interlocking helical splines (neither of which are shown).

The tappet 34 is designed to extend toward and away from a brake rotor (not shown) to initiate or terminate braking of the rotor. The tappet 34 can also move toward or away from the rotor to account for brake lining wear or excessive clearance between the brake pad (not shown) and the rotor.

Figure 3:
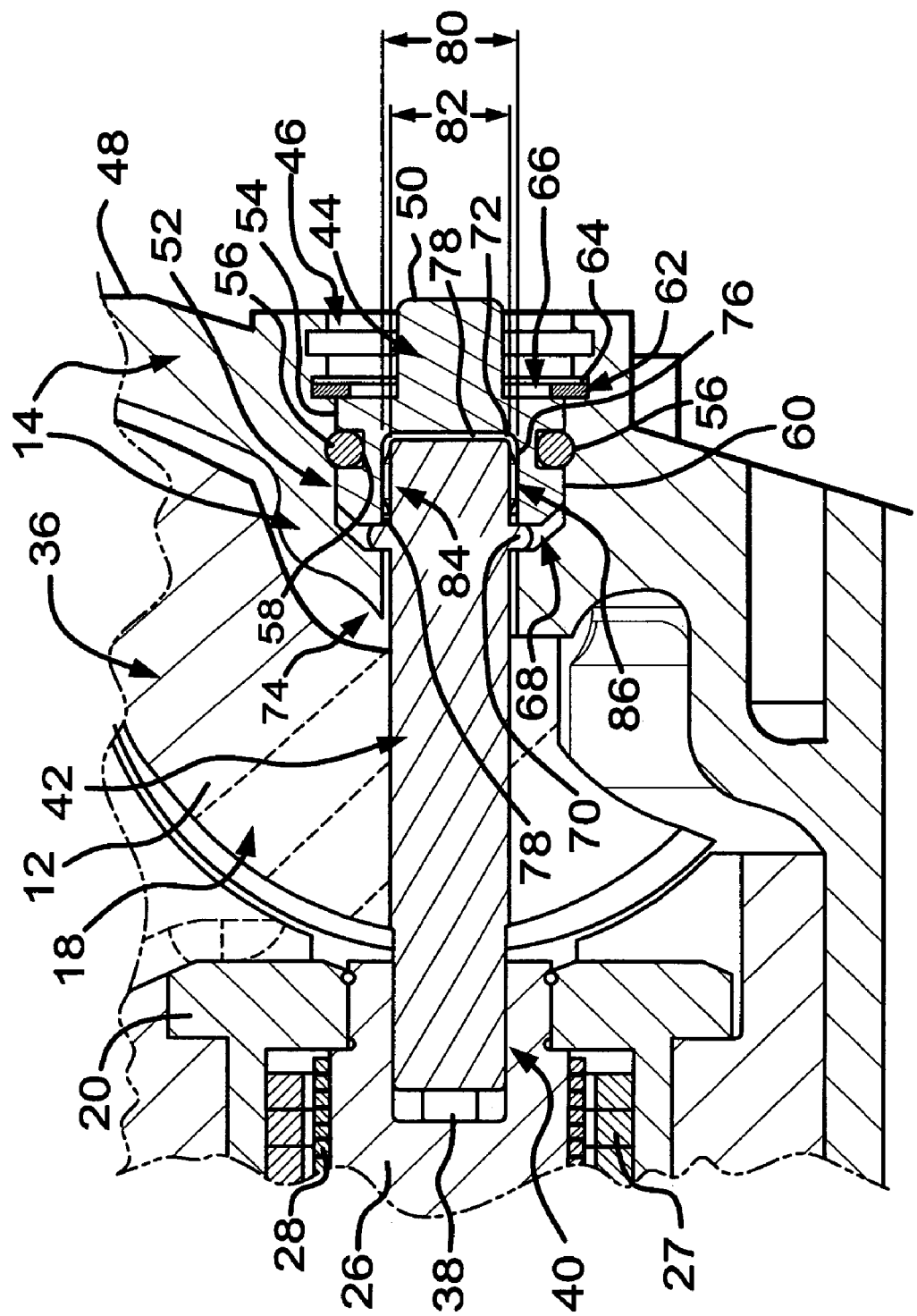
FIG. 3 is a cut-away, partial side view depicting a detailed portion of FIG. 2.

A preferred embodiment of a overload protection clutch mechanism 36 of the present invention will now be described. The clutch drive shaft 26 has a recess 38 in one end, as seen in FIGS. 1, 2 and 3. The recess 38 is designed to accept a first portion 40 of an inner shaft 42. Preferably, the inner shaft 42 is secured to the clutch drive shaft 26 by complementary interlocking structures, threads, mechanical fasteners and/or frictional engagement. It should be appreciated that the inner shaft 42 can be secured to the clutch drive shaft 26 with the above-described means without the inner shaft 42 being located in a recess 38 of the clutch drive shaft 26.

The inner shaft 42 extends from the clutch drive shaft 26 to an outer shaft 44. The outer shaft 44 is preferably housed within a cavity 46 in the caliper housing 14. The cavity 46 preferably provides access to a portion of the outer shaft 44 from the exterior 48 of the caliper housing 14. More preferably, a stem 50 of the outer shaft 44 extends at least partially through the cavity 46.

The stem 50 is secured to an increased diameter portion 52 of the outer shaft 44. The increased diameter portion 52 is located proximate a wall 54 of the cavity 46. Preferably, at least one seal 56, such as an O-ring, is located in a groove 58 of an outer surface 60 of the increased diameter portion 52 to sealingly engage with the wall 54 of the cavity 46. The seal 56 is designed to prevent lubricating fluids from escaping from the housing 14 and also prevent contaminants, such as dirt and debris, from entering the housing 14 through the cavity 46. It is preferred that the outer shaft 44 is mounted for selective rotation within cavity 46.

As can be seen in FIGS. 1, 2 and 3, a retaining ring 62 is preferably located in a groove 64 in the cavity 46. The retaining ring 62 abuts an outside portion 66 of the increased diameter portion 52 of the outer shaft 44. The retaining ring 62 prevents axial movement of the outer shaft 44, but allows the outer shaft 44 to rotate in the cavity 46.

An inside portion 68 of the outer shaft 44 preferably abuts a ring 70, or flange, located about the inner shaft 42. The ring 70 and the inside portion 68 prevent axial movement of the outer shaft 44 and/or the inner shaft 42 with respect to one another. Specifically, the outer shaft 44 is prevented from axial movement by virtue of the retaining ring 62 and the ring 70 on the inner shaft 42. The inner shaft 42 is prevented from axial movement by the ring 70 of the inner shaft 42 abutting a portion of the caliper housing 14 and the ring 70 abutting the outer shaft 44.

A recess 72 of the outer shaft 44 receives a second portion 74 of the inner shaft 42 therein. Preferably, walls 76 of the recess 72 and the second portion 74 of the inner shaft 42 define a gap 78 between them as best seen in FIG. 3. In the preferred embodiment, the walls 76 of the recess 72 have a substantially constant inside diameter 80 and the second portion 74 of the inner shaft 42 has a substantially constant outside diameter 82. Therefore, the gap 78 between the walls 76 of the recess 72 and the second portion 74 of the inner shaft 42 has a substantially constant dimension.

A torque limiting device 84 is preferably located in the gap 78 between the walls 76 of the recess 72 and the second portion 74 of the inner shaft 42. More preferably, the torque limiting device 84 is located substantially about the second portion 74 of the inner shaft 42.

Figure 4:
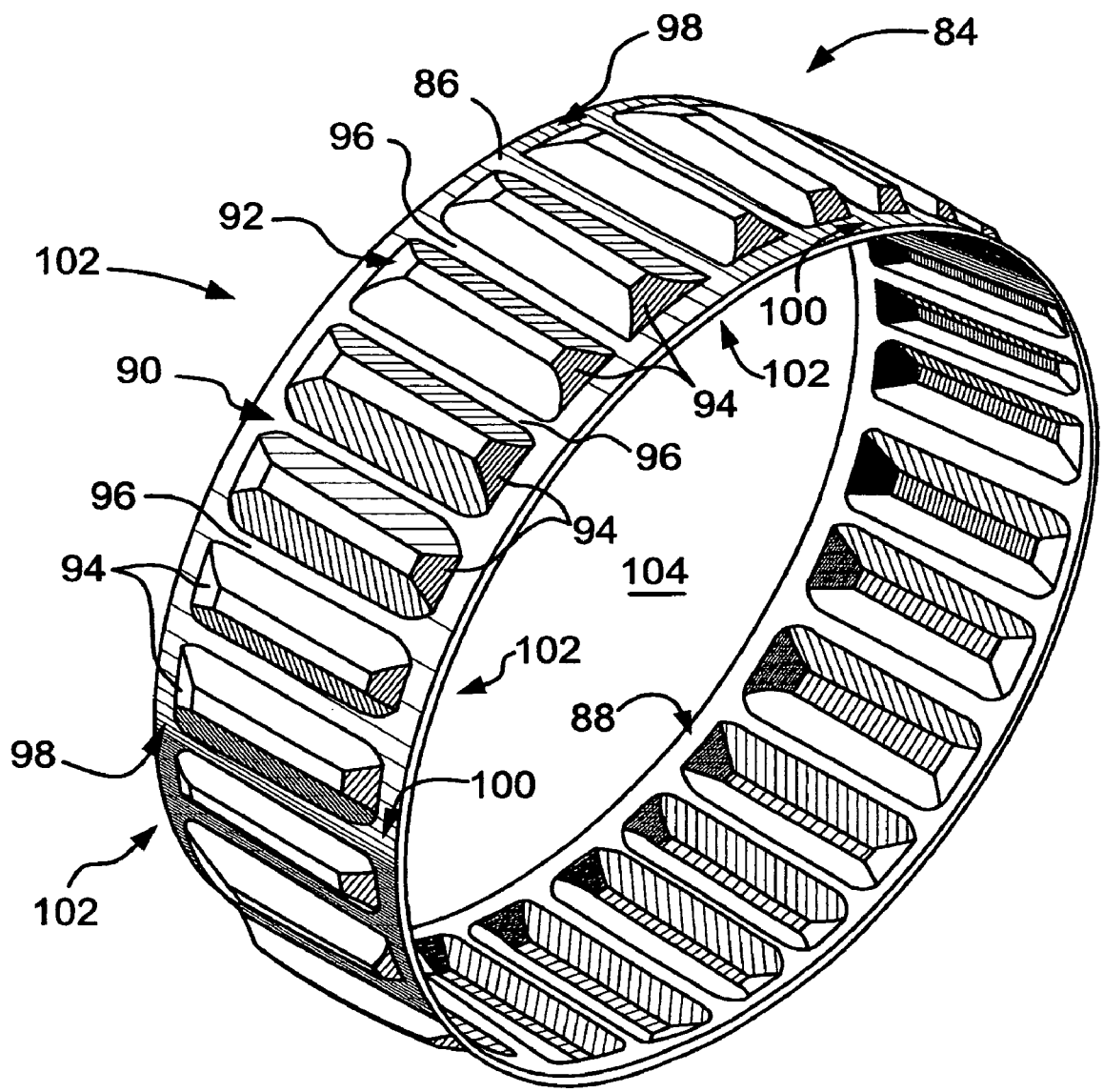
FIG. 4 is a perspective view of a preferred embodiment of the present invention.

Preferably, the torque limiting device 84 is a ring 86 having an inner surface 88 and an outer surface 90, as best seen in FIG. 4. The ring 86 preferably has at least one raised surface 92 on the outer surface 90. More preferably, the outer surface 90 of the ring 86 has a plurality of ridges 94 that alternate with a plurality of valleys 96. The ridges 94 preferably contact the walls 76 of the recess 72.

The plurality of ridges 94 and valleys 96 are preferably bounded on either side by a first band 98 and a second band 100 on the side portions 102 of the ring 86. The first band 98 and the second band 100 define the side portions 102 of the ring 86 and they both comprise portions of the inner surface 88 and the outer surface 90 of the ring 86.

Preferably, the ring 86 is constructed of metal, although other materials, such as plastic, synthetic rubber and/or nylon may be used without departing from the scope of the present invention. Regardless of the material selected, it is preferred that the ring 86 be flexible and/or compressible. Those skilled in the art will appreciate that by varying the thickness of a particular material and/or selecting different materials, the flexibility and/or the compressibility of the ring 86 can be varied. Those skilled in the art will also appreciate that various materials will also have different coefficients of friction.

Although a preferred embodiment of the ring 86 is disclosed above, other embodiments of the ring 86 are well within the scope of the present invention. These embodiments include utilizing more than one ring 86 between the shafts 42, 44 and locating all, or almost all, of the outer surface 90 of the ring 86 substantially in contact with the walls 76 of the recess 72. Those skilled in the art will also appreciate that the ring 86 may be constructed so that the ridges 94 are on the inner surface 88 or on both the inside surface 88 and the outer surface 90. It should be understood that the ridges 94 and the valleys 96 may extend from one side portion 102 to the other side portion 102 without any band 98 or 100 at all.

Preferably, at least the inner shaft 42, the outer shaft 44 and the ring 86 are installed in the caliper housing 14 and remain there during operation of the brake actuator mechanism and the operation of the vehicle.

A method of utilizing the present invention comprises locating the inner shaft 42 within the recess 38 of the clutch drive shaft 26 and securing them together. The ring 86 is located about the second portion 74 of the inner shaft 42. The outer shaft 44 is located into the cavity 46 of the caliper housing 14. The second portion 74 of the inner shaft 42 is located within the recess 72 of the outer shaft 44. The retaining ring 62 is then located in the groove 58 in the caliper housing 14 to secure the outer shaft 44 in place.

Figure 5:
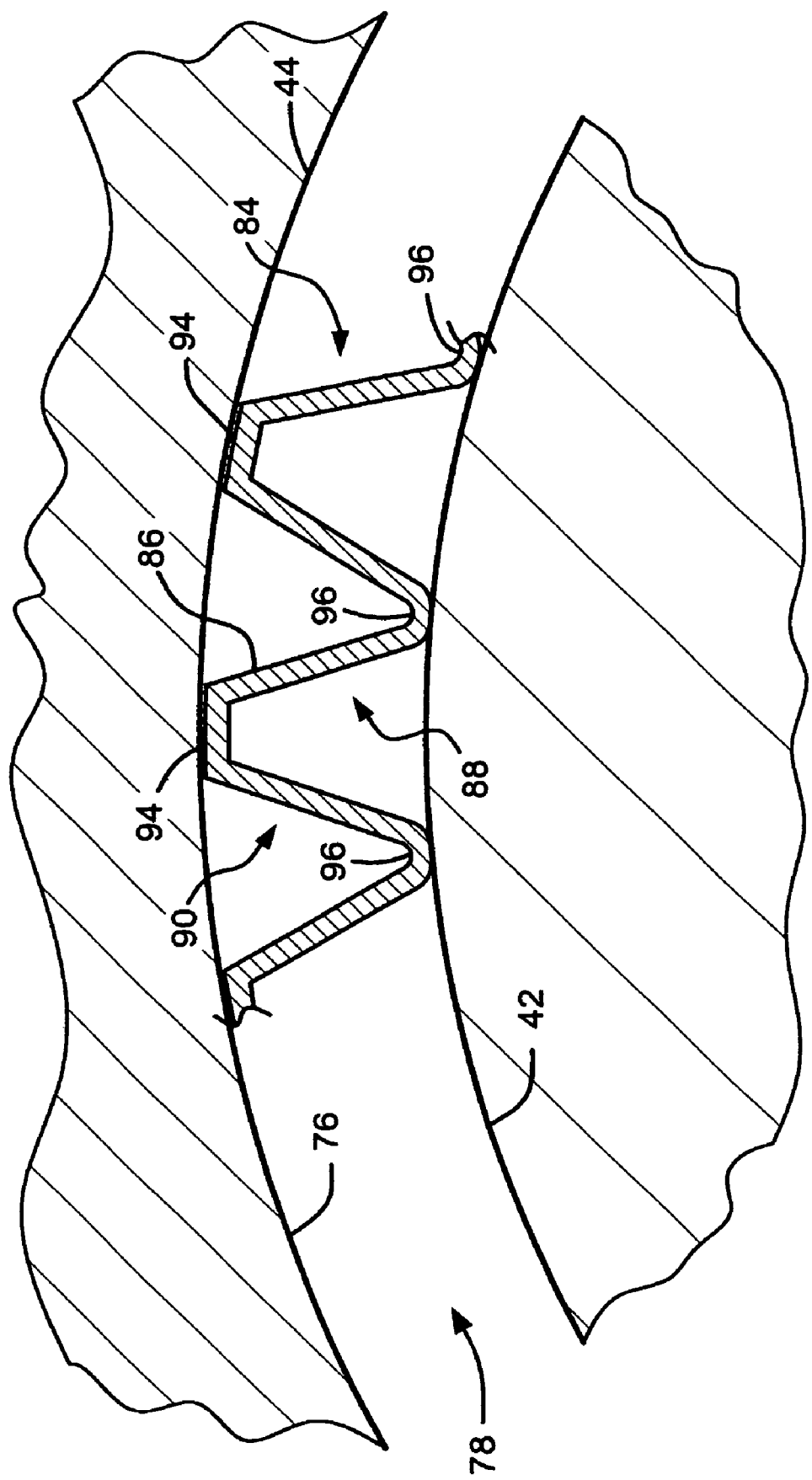
FIG. 5 is a schematic, cut-away side view depicting a preferred embodiment of a portion of a torque limiting device installed between a portion of an inner shaft and a portion of an outer shaft.

Locating the second portion 74 of the inner shaft 42 with the ring 86 thereon into the recess 72 of the outer shaft 44 compresses the ring 86 between the walls 76 of the recess 72 and the inner shaft 42. Preferably, the ridges 94 on the outer surface 90 of the ring 86 exert a substantially normal force on the walls 76 of the recess 72. Compression of the ring 86 causes all or most of the valleys 96 to deflect, or slightly bend, inwardly toward a center portion 104 of the ring 86. As shown in FIG. 5, the deflected valleys 96 contact the inner shaft 42 and exert a substantially normal force on the inner shaft 42.

The amount of force exerted by the valleys 96 and the ridges 94 on their respective adjacent surfaces 74, 76, all of which can vary from one another or be substantially the same, is a function of the material of which the ring 86 is constructed and the design of the ring 86. The frictional resistance between the valleys 96 and the ridges 94 on their respective surfaces, all of which can vary from one another or be substantially the same, is also a function of the material of which the ring 86 is constructed, the design of the ring 86 and the materials of the shafts 42, 44.

The stem 50 of the outer shaft 44 is gripped by a tool (not shown) and the stem 50 is rotated in either a clockwise or a counterclockwise direction. Rotation of the stem 50 causes the outer shaft 44 to rotate within the cavity 46. Under most circumstances, the ring 86 between the outer shaft 44 and the inner shaft 42 couples the inner shaft 42 to the outer shaft 44 and the inner shaft 42 rotates simultaneously with the outer shaft 44. The rotation of the inner shaft 42 rotates the clutch drive shaft 26 which, in turn, rotates the gear train 30. The gear train 30 rotates the tappet sleeve which causes the tappet 34 to extend toward, or more away from, the brake rotor, depending on the rotational direction of the stem 50.

If a torsional force greater than a predetermined limit is applied in either direction to the stem 50 of the outer shaft 44, the frictional engagement of the ring 86 with the outer shaft 44 and the force exerted by the ring 86 on the outer shaft 44, will be overcome. In this situation, the outer shaft 44 will be allowed to rotate with respect to the stationary inner shaft 42. Those skilled in the art will appreciate 86 that virtually any predetermined limit can be used based on the design of the ring 86 and the materials from which the ring 86 and the shafts 42, 44 are constructed.

Those skilled in the art will also appreciate that based on the frictional coefficient, or frictional coefficients, between the various components of the ring 86 and shafts 42, 44, and the construction of the ring 86, that the ring 86 may rotate with the outer shaft 44 and slip against the inner shaft 42, or that the ring 86 may remain stationary against the inner shaft 42 and slip against the outer shaft 44.

Regardless of whether the ring 86 slips against the outer shaft 44 or the inner shaft 42, the ring 86 prevents torsional damage to the brake actuator mechanism 10 by preventing a torsional force greater than a predetermined level to be transmitted from the outer shaft 44 to the inner shaft 42 and into the clutch drive shaft 26.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A brake actuator mechanism, comprising:
   an inner shaft having a first portion connected to a clutch mechanism and a second portion distally opposite said first portion and having a first circumferential ring;
   an outer shaft overlapping at least a portion of said second portion of said inner shaft, said outer shaft terminating at said first circumferential ring of said inner shaft so that said outer shaft does not overlap said clutch mechanism;
   a second ring disposed between said inner shaft and said outer shaft, said second ring having at least one raised surface for selectively coupling said inner shaft and said outer shaft;
   wherein said second ring is compressed between said inner shaft and said outer shaft and couples said inner shaft and said outer shaft via a frictional engagement to a pre-determined torsional limit, and beyond said pre-determined torsional limit said second ring allows said outer shaft to rotate with respect to inner shaft.

2. The mechanism of claim 1, wherein said outer shaft, said inner shaft and said second ring are housed within a caliper housing.

3. The mechanism of claim 2, wherein a retaining ring is located within a groove in said caliper housing to secure said outer shaft within said caliper housing.

4. The mechanism of claim 1, wherein said outer shaft has a circumferential groove in an outer surface thereof, said groove receiving a seal therein.

5. The mechanism of claim 1, wherein said second ring is constructed of a flexible material.

6. The mechanism of claim 1, wherein said outer shaft has a recess for receiving said second portion of said inner shaft therein.

7. The mechanism of claim 6, wherein said recess has a substantially constant inner diameter and said second portion of said inner shaft has a substantially constant outer diameter.

8. The mechanism of claim 1, wherein said second ring is located about said second portion of said inner shaft.

9. The mechanism of claim 1, wherein said second ring has an inner surface and an outer surface.

10. The mechanism of claim 9, wherein said raised surface is on said outer surface of said second ring.

11. The mechanism of claim 10, wherein said raised surface on said outer surface is a series of ridges that alternate with a series of valleys.

12. The mechanism of claim 11, wherein said ridges and said valleys of said outer surface are bounded by two bands, wherein said ridges contact said outer shaft and said valleys contact said inner shaft.

13. The mechanism of claim 12, wherein said ridges exert a normal force on said outer shaft and said valleys exert a normal force on said inner shaft.

14. A brake actuator mechanism, comprising:
   an inner shaft having a first portion connected to a clutch mechanism and a second portion distally opposite said first portion and having a radially extending first circumferential ring unitary with said inner shaft;
   an outer shaft having a recess for receiving said second portion of said inner shaft, said recess being located opposite said clutch mechanism so that said outer shaft does not overlap said clutch mechanism, wherein a gap is formed between said recess and said second portion of said inner shaft; and
   a second ring located in said gap and about said inner shaft, said second ring having a portion in contact with said recess and a portion in contact with said second portion of said inner shaft, wherein said second ring selectively couples said inner shaft and said outer shaft;
   wherein said second ring is compressed between said inner shaft and said outer shaft and couples said inner shaft and said outer shaft via a frictional engagement to a pre-determined torsional limit, and beyond said pre-determined torsional limit said second ring allows said outer shaft to rotate with respect to inner shaft.

15. A method for selectively coupling a brake actuator mechanism, comprising:
   providing an outer shaft having a recess;
   locating an inner shaft within said recess until a first circumferential ring formed from said inner shaft and fixed about said inner shaft abuts an inner end portion of said outer shaft to prevent axial movement of said outer shaft with respect to said inner shaft and so that said outer shaft does not overlap a clutch mechanism, wherein a gap is formed between said recess and said inner shaft; and selectively coupling said inner shaft and said outer shaft with a second ring located in said gap, said second ring exerting a predetermined force on both said inner shaft and said outer shaft;

wherein said second ring is compressed between said inner shaft and said outer shaft and couples said inner shaft and said outer shaft via a frictional engagement to a pre-determined torsional limit, and beyond said pre-determined torsional limit said second ring allows said outer shaft to rotate with respect to inner shaft.

16. The method of claim 15, wherein said second ring prevents torsional damage to a clutch mechanism by allowing said inner shaft to rotate with respect to said outer shaft when said outer shaft receives a torque beyond a pre-determined limit.

17. The method of claim 15, wherein said second ring has a plurality of ridges and a plurality of valleys and compression of said second ring causes said valleys to deflect and frictionally engage said inner shaft.

18. The method of claim 17, wherein said second ring has an outer surface with a plurality of ridges that frictionally engage with said outer shaft.

* * * * *